Patented Mar. 5, 1940

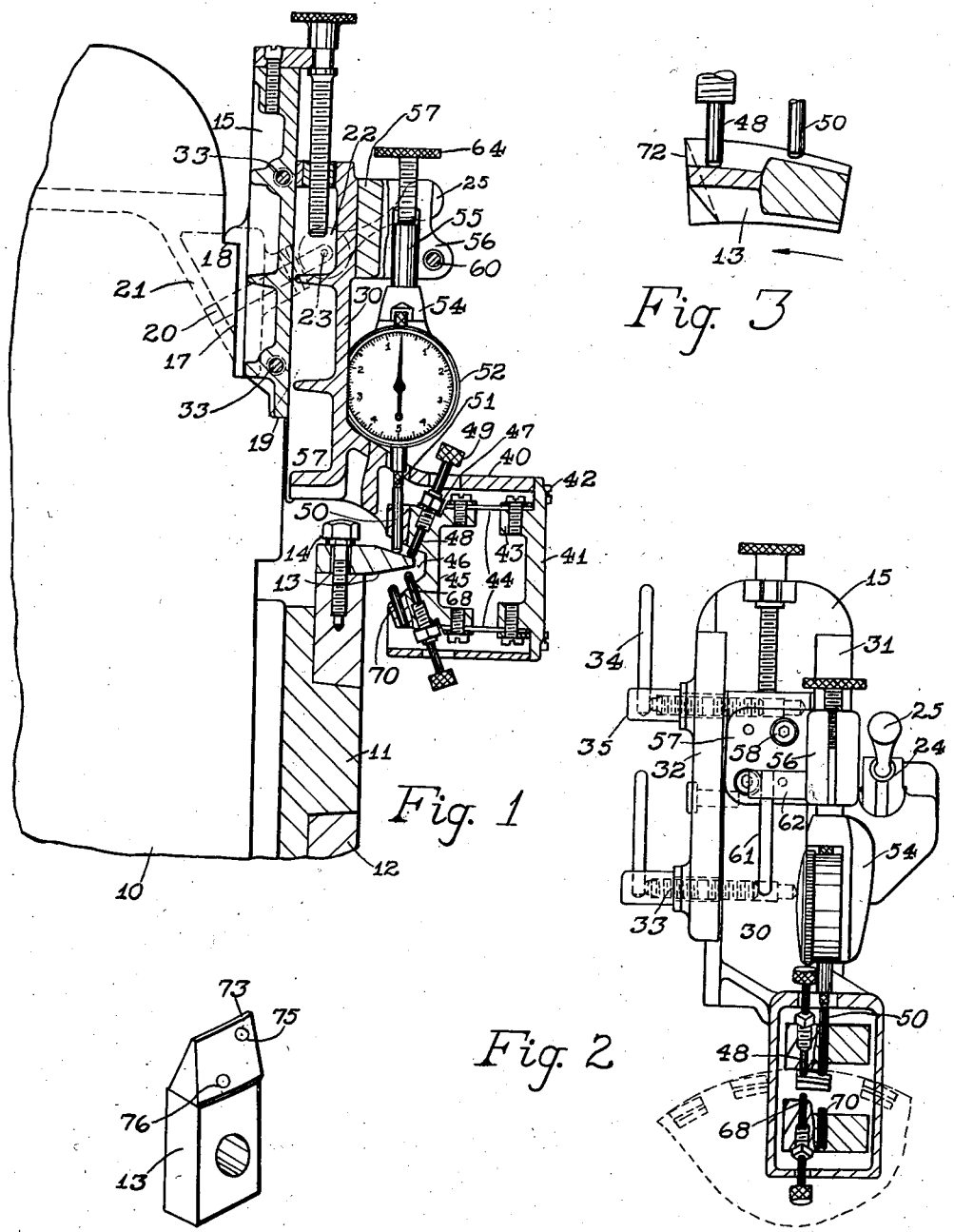

2,192,343

UNITED STATES PATENT OFFICE 2,192,343

CUTTER TRUING DEVICE

Schuyler H. Earl and Leonard O. Carlsen, Rochester, N. Y., assignors to Gleason Works, Rochester, N. Y., a corporation of New York Application May 5, 1937, Serial No. 140,989

5 Claims. (Cl. 33—185)

The present invention relates to apparatus for testing the accuracy of face-mill gear cutters, such as are employed in the cutting of spiral bevel and hypoid gears.

A face-mill gear cutter has a plurality of cutting blades which project beyond one side face of the cutter and are arranged circularly about its axis. To insure that each blade of the cutter does its proper share of the work and to prevent undue wear on any of the blades, and to cut quiet gears, it is necessary that the blades of a cutter track correctly behind one another, that is, be concentric and that corresponding side cutting edges of the blades have the same pressure angle.

This has long been recognized and special testing equipment is available for testing the concentricity and pressure angles of the blades of face-mill gear cutters. Such equipment as has been produced heretofore, however, is single-purpose equipment. One type of testing device is made to test the concentricity of the blades of a cutter and an entirely different piece of apparatus is produced to test the pressure angles. Furthermore, such equipment as has heretofore been devised, has been made for testing the cutter when it is off of the gear cutting machine and before it is mounted on the machine. The blades of a cutter may, however, be trued up both as regards radial position and pressure angle on the testing apparatus and the cutter still may not run true in use because the cutter spindle itself may be eccentric in its bearings or the cutter might even be secured eccentrically to the spindle.

One object of the present invention is to provide testing apparatus which will permit of testing simultaneously both the radial positions and the pressure angles of blades of a face-mill gear cutter.

A further object of the invention is to provide apparatus which is adapted to be mounted upon the gear cutting machine itself to permit testing a face-mill gear cutter upon the machine prior to use so that the cutter can be tested in actual cutting position and the accuracy of its cutting action may be precisely determined.

Other objects of the invention will appear hereinafter from the specification and from the recital of the appended claims.

In the drawing:

Fig. 1 is a fragmentary view showing, in section, a testing device made according to one embodiment of this invention and mounted upon a face-mill gear cutting machine in position to gage the cutter;

Fig. 2 is a view taken at right angles to the view of Fig. 1, a part of the testing device being broken away to show its construction;

Fig. 3 is a diagrammatic view illustrating how the testing apparatus of the present invention operates, a face-mill gear cutter blade being shown in plan with parts broken away to illustrate how contact is made between the testing apparatus and a side of the blade at two points spaced along the height and the length of the blade; and Fig. 4 is a perspective view of the blade, further illustrating the spaced arrangement of the contact members of testing apparatus made according to the present invention and the function of this spaced arrangement.

With the present invention, a testing device is provided that is adapted to be mounted upon a face-mill gear cutting machine to be adjustable radially of the axis of the cutter. This testing device is provided with two spaced contact members which are displaced from one another in the direction of height and in the direction of length of a blade so that they engage the blade successively as the blade is passed under the testing device in the rotation of the cutter. The two contact members are mounted upon a block that is movable radially of the axis of the cutter and they are connected to an indicating device, such as a dial gage, in such manner that the radial movement of the contact members is measured. By rotating the cutter to pass each of its blades under the contact members, the concentricity of the blade with reference to the axis of the cutter spindle can be tested. Moreover, since two contact members are provided which engage a blade at different points in the height of the blade, the inclination of the blade to the axis of the cutter spindle can be tested and any variation in inclination, that is, pressure angle of different blades with respect to the axis can be determined. Since the test is made on the gear cutting machine itself, it is possible to determine whether the cutter will run true with the cutter spindle and, if not, to make the necessary adjustments of the individual blades to obtain this trueness. With the apparatus of the present invention, then, it is possible to obtain much more accurate gear cutting than has heretofore been attainable when the cutter is trued first and then mounted on the machine. Moreover, a saving in cost of testing equipment and in time of testing is possible because only one piece of apparatus and one set-up is required to test a cutter for concentricity and pressure angle where two pieces of apparatus and two set-ups have been required heretofore.

Conventional face-mill gear cutters are made with alternate inside and outside cutting blades. The apparatus shown in the drawing is provided with two contact members for testing the outside surfaces of the blades and two contact members for testing the inside surfaces of the blades and both inside and outside cutting blades can be tested on the same testing device.

Reference will now be made to the drawing for a more detailed description of the present invention. 10 denotes a part of the tool end of a standard face-mill gear cutting machine. 11 designates the nose of the cutter spindle of this machine, 12 a face-mill gear cutter, which is mounted upon this spindle and 13 are the blades of this cutter. The cutter shown in the drawing is of the inserted blade type and the blades are secured to the cutter head in the usual manner by screws 14. The present apparatus may be used, however, for testing all types of face-mill gear cutters including segmental cutters and cutters in which the blades are integral with the cutter head.

The testing device comprises a base-plate 15 which is so shaped as to seat against a vertical face 17 and horizontal ledges 18 and 19 formed on the front face of the tool support or column. The base-plate 15 may be secured to the tool support or column 10 in any suitable manner. In the apparatus shown in the drawing, a T-bolt 20 is employed for this purpose. The head of this bolt is adapted to engage in a T-bolt 21 formed in the face of the tool-support or column and the bolt is pivotally connected at its opposite end to a cam or eccentric 22. This eccentric is pivotally mounted by means of the pin 23 between ears 24 formed on the base-plate. The bolt 20 is mounted in the base-plate to move longitudinally thereof and when the eccentric or cam 22 is rocked, as by means of the handle 25, the base-plate may be locked to the tool support 10 or released.

There is a slide 30 mounted upon the base-plate 15 for adjustment radially toward and from the axis of the cutter spindle. This slide is held on the base-plate 15 by the fixed gib 31 and the movable gib 32. The movable gib is secured to the base-plate 15 by screws 33 which are manipulated by handles 34 which are secured in the heads 35 of the screws. The screws thread into the base-plate 15.

The slide 30 is formed with an integral box-like projection 40 to which a plate 41 is secured by screws 42. There are a pair of lugs 43 integral with the plate 41 and to these lugs are secured two pieces of flexible strap-metal 44. These flexible pieces of strap metal carry a block 45.

The block 45 is formed with a generally V-shaped opening 46 into which the blades of a cutter may project for testing. There is a contact member 48 threaded into the block 45. This contact member is adjustable by means of the knurled head 49, and is adapted to engage the outside surfaces of the blades of the cutter to be tested. To take up back-lash between the thread of the contact pin 48 and the block 45, a nut or shoulder 47 may be provided on the pin and a convex spring washer may be interposed between the opposed faces of this shoulder and of the block 45.

There is a second contact member 50 also mounted in the block 45 for engagement with the outside surfaces of the blades of the cutter. This second contact member has a pressed fit in the block 45 and is spaced from the contact member 48 both in the direction of height and in the direction of the length of the blades of the cutter. It is adapted to contact with the blades at one end and at its other end it engages the plunger 51 of the dial-gauge 52 which may be of any usual or suitable construction.

The dial-gauge is mounted upon a block 54 that has a post 55 projecting from it. The dial-gauge is held on the slide 30 by a split-clamp 56 which is integral with a plate 57 that is secured to the slide 30 by screws 58.

The split-clamp engages the post 55 of the bracket 54 and is held in clamping position by a screw 60 that is manipulated by a handle 61 which is secured in the head 62 of the screw. A knurl-headed screw 64, which threads into the plate 57 and engages the post 55, serves to adjust the indicating hand of the dial-gauge.

The pins or contact members 48 and 50 are positioned on one side of the V-shaped opening 46 in the block 45 and are for the purpose of engaging the outside surfaces of the blades of a cutter being tested. At the opposite side of this V-shaped opening there are another pair of pins or contact members which are designated at 68 and 70, respectively. The contact member 68 is threaded into the block 45 for adjustment therein and the contact member 70 has a pressed fit into the block. The contact members 68 and 70 are adapted to engage with the inside surfaces of inside cutting blades of a cutter being tested. The contact members 68 and 70, like the contact members 48 and 50, are spaced from one another both in the direction of height and in the direction of length of the blades.

The spacing of the contact members is illustrated in Figs. 2 and 3 for the outside contact members 48 and 50. The contact member 48 is adapted to engage a blade at a point close to its tip 73 while the contact member 50 is displaced with reference to the contact member 48 both in the direction of the length of the blade and in the direction of height.

The sides of face-mill gear cutter blades are relieved behind the side cutting edges and are usually of positive pressure angle and inclination to the axis of the cutter.

Before using, the testing device may be adjusted by means of a master gauge having a cutting blade of the desired pressure angle and radial position. The contact member 50 is engaged with the outside surface of this blade just at the cutting edge 72 of that blade. Then the slide 30 is either adjusted on the base-plate 15 or the screw 64 is adjusted to move the dial-gauge 52 so that the dial will register zero. Then the head carrying the blade is rotated slightly to bring the outside cutting edge of the blade under the contact member 48 and the contact member 48 is adjusted in the block 45 until the dial gauge reads zero in this position also. The contact members 68 and 70 for the inside surfaces of the blades may be set in corresponding fashion with reference to the inside surface of a blade of the master gauge.

With the positions of the contact members thus calibrated, the testing device is mounted upon the machine and brought into operative position by adjustment of the slide 30 to the same setting as employed in setting the gauge. Then the cutter is rotated to bring each outside cutting edge of the cutter under the contact members 48 and 50. As each blade passes under the contact member 50, if the dial-gauge registers zero, it is known that this blade is concentric with the axis of the cutter spindle and in the proper radial position and if the dial-gauge registers a negative or positive quantity, it is known by how much this blade is displaced radially outwardly or inwardly from the correct radial position.

As the blade passes under the contact member 48 in the further rotation of the cutter, if the dial-gauge registers zero, it is known that the pressure angle of the outside surface of the blade is correct. If the dial-gauge registers either a positive or negative quantity, it is known that the pressure angle of the blade is incorrect and it is known by what amount the pressure angle is incorrect.

By thus rotating all of the outside blades of the cutter under the contact members 50 and 48, respectively, it can be determined whether all of the blades of the cutter are concentric and have the same outside pressure angle.

For testing the inside blades, the slide 30 is adjusted to bring the contact members 70 and 68 into operative position. The cutter is then rotated to bring each inside cutting blade into engagement with these contact members. As each inside cutting blade passes over the contact member 70, if the gauge registers zero, it is known that this inside cutting blade is concentric with the axis of the cutter spindle and at the proper radial distance therefrom. As each inside cutting blade passes over the contact member 68, if the gauge registers zero, it is known that the inside surface of this second inside blade is of the correct pressure angle. By rotating the cutter to bring the different inside blades succcesively under the contact members, then, the concentricity of the inside blades and the pressure angles of these blades can be tested.

It is possible to test both the inside and outside blades simultaneously by adjusting the contact members for the outside blades to zero with a master gauge and noting the reading of the dial-gauge when the contact members 70 and 68 pass over an inside blade of this master gauge and then checking the inside and outside blades of the cutter against these same readings. This can be done only in cases where the point width or distance between the outside and inside cutting edges of successive blades is such that an outside blade may contact with the contact member 50 and an inside blade with the contact member 70 without any radial displacement of the slide 30. By making the contact member 70 adjustable, however, as by threading it into the block 45, both the inside and outside blades of any cutter can be tested simultaneously.

While reference has been made above to the method of setting up the testing apparatus with a master gauge, it is common practice also to adjust the gauge 52 and the pins 48 and 68 by setting them to one blade of the cutter. The positions of the other blades are then read relative to this one blade which serves as the master.

In Fig. 4, the circles 75 and 76 indicate, respectively, the relative positions of the contact members 48 and 50 with relation to the outside face of the blade 13. It will be noted that the contact member 48 is displaced in the direction of the height of the blade profile toward the tip of the blade and further that this contact member is displaced in the direction of rotation of the cutter away from the contact member 76. This is further illustrated in Fig. 3 which shows a plan view of the blade 13 with the blade broken away in two sections, the section at the left being taken close to the tip of the blade and the section at the right close to the base of the blade. This figure again shows the relative displacement from one another of the two contact members both as regards height and angular position. The contact members are displaced from one another angularly so that readings on them may be taken separately.

By mounting the block 45 upon two parallel flexible steel straps 44, the block will have a straight line movement under actuation of the contact members and the dial gauge 52 will read directly the radial positions of the blades of the cutter being tested.

While the invention has been illustrated and described in connection with the testing of a face-mill gear cutter whose corresponding side cutting edges are arranged at the same radial distance from the axis of the cutter and have the same pressure angle, it will be understood that a testing device made according to this invention may also be employed in the testing of other types of face-mill gear cutters such as cutters of the scroll of face-mill hobbing type, "single-cycle" cutters, etc. The positions and pressure angles of successive blades of any of these cutters can be measured on the testing device and checked against the theoretically correct positions and pressure angles.

Further while the invention has been described in connection with a particular embodiment thereof, it is to be understood that it is capable of various further modifications. This application is intended to cover any adaptations, uses, or embodiments of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A device for testing the blades of a face-mill gear cutter which comprises a supporting member that is adjustable radially relative to the axis of the cutter, a block mounted on said supporting member for movement radially of the axis of the cutter, a pair of contact members secured in said block and adapted to engage the same side of blades of the cutter, as the cutter is rotated on its axis, but at different points, respectively, along the height of the blades and being displaced from one another angularly about the axis of the cutter, and means for measuring any radial movement of the block as the blades of the cutter pass under the contact members in the rotation of the cutter.

2. A device for testing the blades of a face-mill gear cutter, which comprises a supporting member that is adjustable radially relative to the axis of the cutter, a block mounted on said supporting member for movement radially of the axis of said cutter, a pair of contact members secured in said block, one of which is adjustable relative to the other in a direction generally radial of the axis of the cutter, said contact members being adapted to engage the same side of blades of the cutter as the cutter is rotated on its axis, but being adapted to engage said blades at different points along the height of the blades and being displaced from one another also angularly about the axis of the cutter, and means for measuring any radial movement of the block as the blades of the cutter pass under the contact members.

3. A device for testing the blades of a face-mill gear cutter comprising a support, a pair of contact members which are mounted thereon to be movable radially of the axis of the cutter and which are also mounted thereon in spaced relationship to engage the same side of a blade of the cutter at different points in the height of the blade as a blade is rotated under said contact members, and means for measuring any radial movement of either of the contact members as a blade is rotated under them.

4. A device for testing the blades of a face-mill gear cutter comprising a support, a pair of contact members which are mounted thereon to be movable radially of the axis of the cutter, said contact members being also mounted thereon so as to be spaced from one another both angularly about the axis of the cutter and in the direction of the height of the blades so that they will engage the same side of a blade of the cutter successively and at different points along the height of the blade as a blade is rotated under said contact members, and a single means operatively connected to the two contact members for measuring any radial movement of the contact members as a blade is rotated under them.

5. A device for testing the blades of a face-mill gear cutter comprising a base, a support mounted on the base for adjustment in a direction radial of the axis of the cutter, a block mounted on said support for movement in a direction radial of the axis of the cutter, two pairs of contact members mounted on said block, one pair being adapted to engage one side of the blades of the cutter and the other pair the other side of the blades, the two members of each pair being mounted on said block so that they are spaced from one another both in the direction of the height of the blades and in the direction of the length of the blades so that they engage a blade successively as the blade is rotated under them, means for adjusting the support on the base to bring one or other pair of contact members selectively into operative position, and a single means for measuring radial movement of the block.

SCHUYLER H. EARL.
LEONARD O. CARLSEN.